(12) United States Patent
Malik

(10) Patent No.: US 6,173,050 B1
(45) Date of Patent: *Jan. 9, 2001

(54) SYSTEM AND METHOD FOR ACTIVATION OF AN ENHANCED TELECOMMUNICATION SERVICE

(75) Inventor: Dale W. Malik, Atlanta, GA (US)

(73) Assignee: Bellsouth Intellectual Property Corporation, Wilmington, DE (US)

( * ) Notice: Under 35 U.S.C. 154(b), the term of this patent shall be extended for 0 days.

This patent is subject to a terminal disclaimer.

(21) Appl. No.: 09/471,058

(22) Filed: Dec. 22, 1999

Related U.S. Application Data

(63) Continuation of application No. 08/958,225, filed on Oct. 27, 1997, now Pat. No. 6,018,574.

(51) Int. Cl.[7] .................................................. H04M 7/00
(52) U.S. Cl. ..................... 379/219; 379/211; 379/219; 379/220; 379/221; 379/88.23
(58) Field of Search ................. 379/88.01, 142, 379/201, 210, 211, 212, 88.23, 219, 221

(56) References Cited

U.S. PATENT DOCUMENTS

| | | | |
|---|---|---|---|
| 5,027,384 | * | 6/1991 | Morganstein ..................... 379/88.23 |
| 5,764,747 | * | 6/1998 | Yue et al. ............................. 379/210 |
| 6,018,574 | * | 1/2000 | Malik .................................. 379/219 |

* cited by examiner

*Primary Examiner*—Krista Zele
*Assistant Examiner*—Bing Bui
(74) *Attorney, Agent, or Firm*—Nora M. Tocups; James L. Ewing, IV; Kilpatrick Stockton

(57) ABSTRACT

A system and method for activation of an enhanced telecommunication service without a turn-on call by a subscriber. The present invention is described in the AIN environment, where an enhanced telecommunication service is set up for a directory number. The enhanced telecommunication service has an active state wherein the enhanced telecommunication service is applied to calls received for the directory number. The enhanced telecommunication service also has an inactive state wherein the enhanced telecommunication service is not applied to calls received for the directory number. The first call is directed to the directory number, where the enhanced telecommunication service is in the inactive state. A no answer condition from the directory number is detected with respect to the first call. In response to the detection of the no answer condition, the enhanced telecommunication service changes to the active state. The enhanced telecommunication service is maintained in the active state for successive calls, whereby the enhanced telecommunication service is activated by the detection of the no answer condition for the first call, without the turn-on call from the subscriber, and remains activated for successive calls to the directory number.

8 Claims, 3 Drawing Sheets

SYSTEM AND METHOD FOR ACTIVATION OF AN ENHANCED TELECOMMUNICATION SERVICE

RELATED APPLICATION DATA

This application is a continuation of Ser. No. 08/958,225 filed Oct. 27, 1997, now U.S. Pat. No. 6,018,574, issued on Jan. 25, 2000.

TECHNICAL FIELD

The present invention relates generally to telecommunications systems, and more particularly, relates to a system for activation of an enhanced telecommunication service.

BACKGROUND OF THE INVENTION

As the world of telecommunications becomes increasingly more sophisticated, society reaps the benefits through new, improved, and/or enhanced telecommunication services, as well as more service choices. These enhanced telecommunication services include voice mail, audio name screening, flexible call forwarding (FCF), and deluxe calling name delivery. These enhanced telecommunication services are available to a user of a modern public switched telephone network (PSTN) and are considered valuable services by many subscribers because they enhance conventional telephone service. For example, when the FCF service is activated by a subscriber/called party, the FCF service forwards a call directed to a called party number to terminating equipment associated with a directory number that the called party has chosen. Typically, the called party must activate the FCF service by entering a feature code and dialing a forwarding directory number. The FCF service thereafter forwards calls to a forwarding telephone number. Without this initial activation of the FCF service by the subscriber, call forwarding does not occur. The necessity of activating the FCF service oftentimes can be burdensome to the subscriber who only needs basic call coverage when the subscriber is away. Providing an enhanced telecommunication service that does not require this initial activation of the service by the subscriber would be considered valuable and convenient by many subscribers.

In some enhanced telecommunication services, the subscriber is charged with the responsibility of remembering to initially activate the enhanced telecommunication service to have access to its features and to receive its benefits. Activation of the enhanced telecommunication service usually is executed by hand. For example, the subscriber can dial via a telephone keypad a feature code that is associated with the enhanced telecommunication service. The feature code is recognized in association with the enhanced telecommunication service and causes the enhanced telecommunication service to be activated. A similar process typically is performed to turn off the enhanced telecommunication service. By requiring the entry of the feature code to activate the enhanced telecommunication service, the service can only be used if the subscriber remembers to activate it.

In other words, the enhanced telecommunication service is activated only as a result of an action by the subscriber. The subscriber typically activates the service by dialing a feature code. Hence, if the subscriber does not remember to enter the feature code, the subscriber cannot benefit from the service.

For example, the subscriber may subscribe to the FCF service at her business location. In this example, the FCF service provides the benefit of being able to forward calls from the business location to another location, such as to a cellular telephone, an answering service, or the subscriber's home, especially when calls may not be answered, like after business hours. However, each day at the close of business, the subscriber has to remember to activate the FCF service. Unfortunately, the subscriber occasionally may forget to activate the FCF service, thereby missing important calls or potential business. The FCF service does not provide for activating the service without entering the feature code or dialing a directory number.

In addition, when activated, some enhanced telecommunication services do not become operative until after a specific time period, for example, the time it takes for three rings to occur. This delay occurs for each call and can be a nuisance. For example, during business hours, a subscriber may prefer to answer all incoming calls and allow waiting callers to hear a busy signal. During this time frame, there are no enhanced telecommunication services in use. However, if the subscriber were to leave abruptly, or close for the night, the subscriber may want all calls to be forwarded to another location to greet the caller. To engage forwarding and immediately transfer the subscriber's calls, a subscriber would have to take action to engage the FCF service. Otherwise, calls would be first routed to the subscriber's business for a specific period of time before a "no answer" forwarding signal would send the call elsewhere. The delay in sending the call to a location where it can be answered may cause callers to hang-up prematurely and can adversely affect the business.

Therefore, there is a need for a system and method for activating an enhanced telecommunication service without direct action by the subscriber/called party.

There is also a need for a system and method for immediately handling calls after an enhanced telecommunication service is activated.

SUMMARY OF THE INVENTION

The present invention satisfies the above-described needs by providing a system and method for activation of an enhanced telecommunication service without a turn-on call by a subscriber. The present invention is described in the AIN environment, where an enhanced telecommunication service is set up for a directory number. The enhanced telecommunication service has an active state wherein the enhanced telecommunication service is applied to calls received for the directory number. The enhanced telecommunication service also has an inactive state wherein the enhanced telecommunication service is not applied to calls received for the directory number.

Advantageously, the present invention activates an enhanced telecommunication service without direct action, such as a turn-on call, by the subscriber/called party. Specifically, the present invention provides the benefit of activating the enhanced telecommunication service upon receipt of a first call to the called party number that encounters a no answer condition at the called party number. Another advantage is the present invention diverts all successive calls directed to the called party number for processing without first routing the call to the line of the called party number. Hence, the successive calls receive the enhanced telecommunication service without encountering the no answer condition.

Generally described, the present invention provides a method for activation of an enhanced telecommunication service without a turn-on call by a subscriber. The first call is directed to the directory number, where the enhanced telecommunication service is in the inactive state. A no answer condition from the directory number is detected with respect to the first call. In response to the detection of the no answer condition, the enhanced telecommunication service changes to the active state. The enhanced telecommunication service is maintained in the active state for successive calls, whereby the enhanced telecommunication service is activated by the detection of the no answer condition for the first call, without the turn-on call from the subscriber, and remains activated for successive calls to the directory number.

With respect to the embodiment described in the immediately preceding paragraph, the enhanced telecommunication service preferably is applied to the successive calls to the directory number. Also, the successive calls preferably are diverted for processing without routing the successive calls to a line of the directory number. Furthermore, after making the detection of the no answer condition with respect to the first call, the first call may be routed to a forwarding directory number designated by the subscriber.

In another embodiment of the present invention, with respect to a first call that encounters a no answer condition, a method for activating an enhanced telecommunication service so that successive calls avoid the no answer condition is provided. A first call directed to a directory number is received. In connection with the first call, a detection of the no answer condition is made from the directory number. Upon the detection of the no answer condition, the first call is routed to a special number, where the special number is provisioned with a first trigger and where the first call encounters the first trigger. In response to the first call encountering the first trigger, information related to the directory number is obtained. Based on the information related to the directory number, the directory number is provisioned with a service trigger for activation of enhanced telecommunication service in response to successive calls directed to the directory number, whereby the successive calls encounter the service trigger and receive the enhanced telecommunication service rather than encountering the no answer condition.

With respect to the embodiment described in the immediately preceding paragraph, information related to the directory number includes a forwarding directory number. After obtaining the forwarding directory number, the first call preferably is routed to the forwarding directory number.

In another embodiment of the present invention, with respect to a first communication that encounters a no answer condition, a system for activating an enhanced telecommunication service so that further communications avoid the no answer condition and for routing the first communication to a forwarding directory number is provided. In connection with this embodiment, a first network element is operative to receive a first communication directed to a directory number. In connection with the first communication, the first network element is operative to make a detection of a no answer condition from the directory number. Upon the detection of the no answer condition, the first network element is operative to route the first communication to a special number, the special number being provisioned with a public office dialing plan (PODP) trigger. A second network element is provided being operative to make a detection of the PODP trigger. Upon the detection of the PODP trigger, the second network element is operative to obtain the forwarding directory number from a database. The second network element is operative to obtain instructions to activate a prescribed terminating attempt (TAT) trigger in connection with the directory number and to transmit the forwarding directory number and the instructions to the first network element. Also, the first network element is operative to route the first communication to the forwarding directory number, whereby activating the prescribed TAT trigger in connection with the directory number activates the enhanced telecommunication service so that further communications directed to the directory number receive the enhanced telecommunication service rather than encountering the no answer condition.

With respect to the embodiment described in the immediately preceding paragraph, the first network element is operative to receive a second communication directed to the directory number. The second communication encounters the prescribed TAT trigger. The second network element is operative to receive the second communication, the second communication receiving the enhanced telecommunication service. The second network element also is operative to obtain the forwarding directory number and to route the second communication and the forwarding directory number to the first network element. Finally, the first network element is operative to route the second communication to the forwarding directory number.

In summary, the present invention provides a system and method for activating an enhanced telecommunication service without direct action, such as a turn-on call, by the subscriber/called party. The present invention also provides a system and method for activating the enhanced telecommunication service upon receipt of a first call to the called party number that encounters a no answer condition at the called party number. In addition, the present invention provides a system and method for diverting all successive calls directed to the called party number for processing without first routing the call to the line of the called party number. Finally, the present invention provides a system and method that allows successive calls to receive the enhanced telecommunication service without encountering the no answer condition.

These and other objects, features, and advantages of the present invention may be more clearly understood and appreciated from a review of the following detailed description of the disclosed embodiments and by reference to the appended drawings and claims.

DETAILED DESCRIPTION

Figure 1:
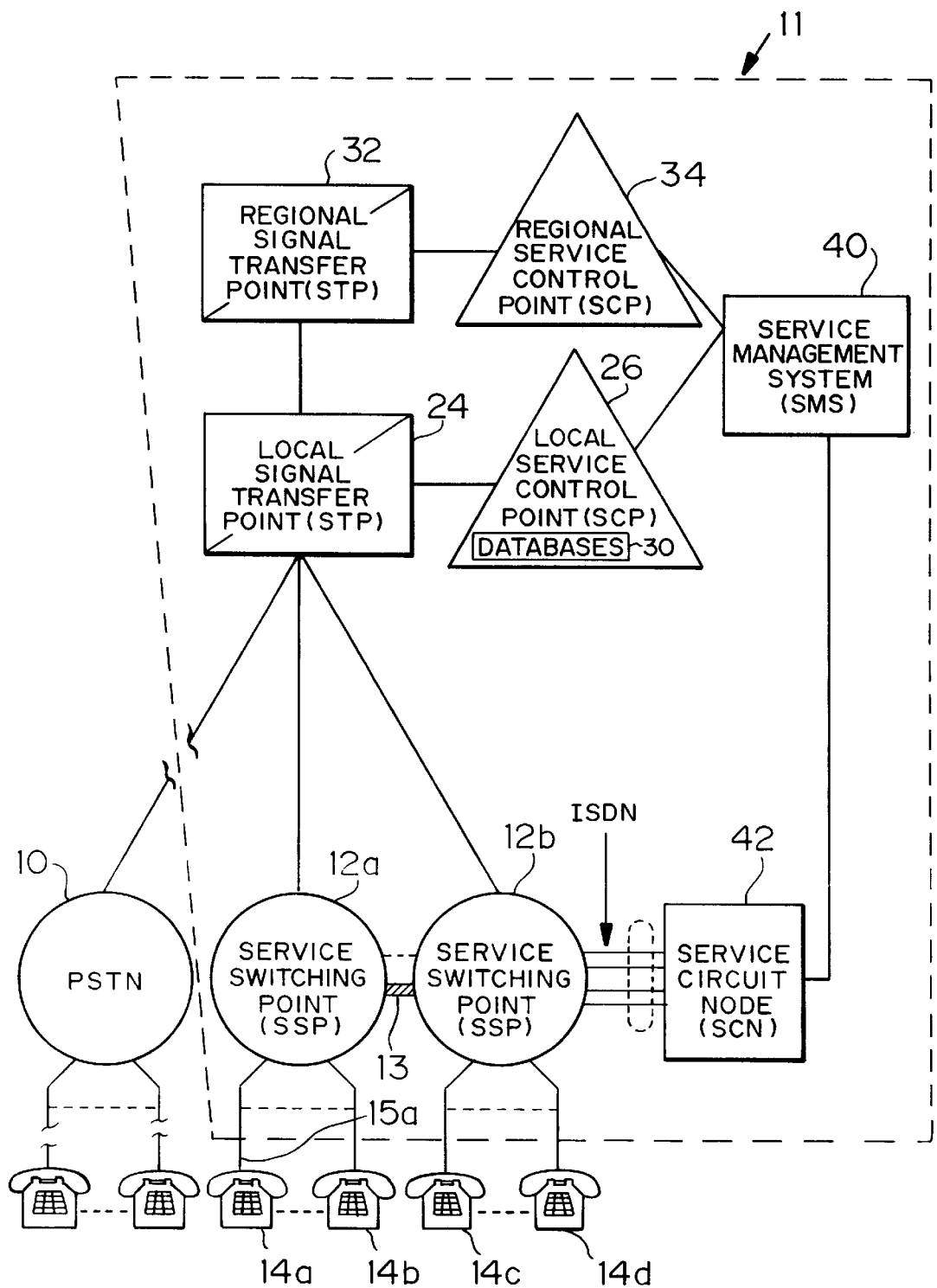
FIG. 1 is a diagram of an exemplary environment for operation of the present invention.

The present invention is directed to a system and method that activates an enhanced telecommunication service without a turn-on call by a subscriber. Specifically, activation of the enhanced telecommunication service occurs as a direct result of a first unanswered call to a called party number. In other words, the enhanced telecommunication service is activated by merely placing a call to the called party number, where the call goes unanswered at the location where the call is directed. After the first call, all successive calls directed to the called party number receive the enhanced telecommunication service without first routing the call to the line of the called party number. The called party can deactivate the enhanced telecommunication service at any time by entering a feature code.

Referring now to the drawings, in which like numerals represent like elements throughout the several figures, aspects of the present invention and exemplary operating environments are described.

Exemplary Operating Environment

Overview of AIN Elements

FIG. 1 is a diagram of an exemplary embodiment and exemplary environment for operation of the present invention. This exemplary environment is the public switched telecommunication network (PSTN) 10. A portion 11 of the PSTN is illustrated in FIG. 1 and described generally below. In particular, the detailed portion 11 of the PSTN illustrates a part of the Advanced Intelligent Network (AIN) of a typical local exchange carrier. For brevity, only a basic explanation of the PSTN 10 is provided herein. Where the PSTN 10 operates or is composed differently in an important aspect from that which would be understood by those skilled in the art, additional details are provided herein. For further information regarding the referenced PSTN 10 and AIN aspects thereof, the interested reader is referred to the commonly-owned patent to Weisser, U.S. Pat. No. 5,430,719, which is incorporated herein by reference.

The AIN includes a variety of interconnected network elements. A group of such network elements includes the plurality of central offices which are indicated as service switching points (SSPs) 12a, 12b in FIG. 1. An SSP is a switch and the terms are used interchangeably herein. As further illustrated in FIG. 1, the SSPs 12a, 12b have a plurality of subscriber lines connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones commonly designated as 14. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs 12a, 12b are interconnected by a plurality of trunk circuits 13. These are the voice path trunks that interconnect the SSPs to connect communications. The term "communication" or "call" is used herein to include all messages that may be exchanged between caller and called party in the network illustrated in FIG. 1. Each of the SSPs 12a, 12b is connected to another type of AIN element referred to as a local signal transfer point (STP) 24 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 26 that is connected to STP 24 over a SS7 data link. Among the functions performed by the SCP 26 is the maintenance of network databases and subscriber databases as represented collectively by databases 30. These databases may be used in providing enhanced telecommunication services to a customer. Typically, the SCP 26 is also the repository of service package applications (SPAs) that are used in connection with or as part of the databases 30 in the application of enhanced telecommunication services or enhanced features to calling lines.

As used herein, the phrase "enhanced telecommunication services" refers to features or enhancements that are provided by a telecommunication service provider to a customer in addition to conventional telephone service through the PSTN.

Referring again to FIG. 1, the local STP 24 may be connected to other network elements of the PSTN 10 through a regional STP 32, which in turn, may be connected to a regional SCP 34. Both regional SCP 34 and local SCP 26 are connected via respective data links to a service management system (SMS) 40. The SMS 40 interfaces to business offices of the local exchange carrier and interexchange carriers.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 26 through STP 24. The return packet includes instructions to the switch as to how to process the call. The instructions may be to take some special action as a result of a customized calling service or enhanced feature. In response, the switch moves through its call states, collects the called digits, and generates further packets that are used to set up and route the call. Similar devices for routing calls among various local exchange carriers are provided by regional STP 32 and regional SCP 34.

As illustrated in FIG. 1, the AIN also includes a service circuit node 42 (SCN), which may also be referred to herein as a service node (SN). SCN 42 includes voice and dual tone multi-frequency (DTMF) signal recognition devices and voice synthesis devices. SCN 42 is connected to the local SCP 26 via data link using an X.25 protocol and to the SMS 40 via a data link. In addition, SCN 42 typically is connected to one or more (but usually only a few) SSPs via Integrated Service Digital Network (ISDN) links as shown by the connection to SSP 12b.

Generally, the present invention is described in the AIN environment, where an enhanced telecommunication service is set up for a directory number. The enhanced telecommunication service has an active state wherein the enhanced telecommunication service is applied to calls received for the directory number. The enhanced telecommunication service also has an inactive state wherein the enhanced telecommunication service is not applied to calls received for the directory number. The enhanced telecommunication service is activated without a turn-on call from a subscriber as described herein. A first call is directed to the directory number, where the enhanced telecommunication service is in the inactive state. A no answer condition from the directory number is detected with respect to the first call. In response to the detection of the no answer condition, the enhanced telecommunication service changes to the active state. The enhanced telecommunication service is maintained in the active state for successive calls. In summary, the enhanced telecommunication service is activated by the detection of the no answer condition for the first call, without the turn-on call from the subscriber, and remains activated for successive calls to the directory number.

Exemplary Operation

Figure 2:
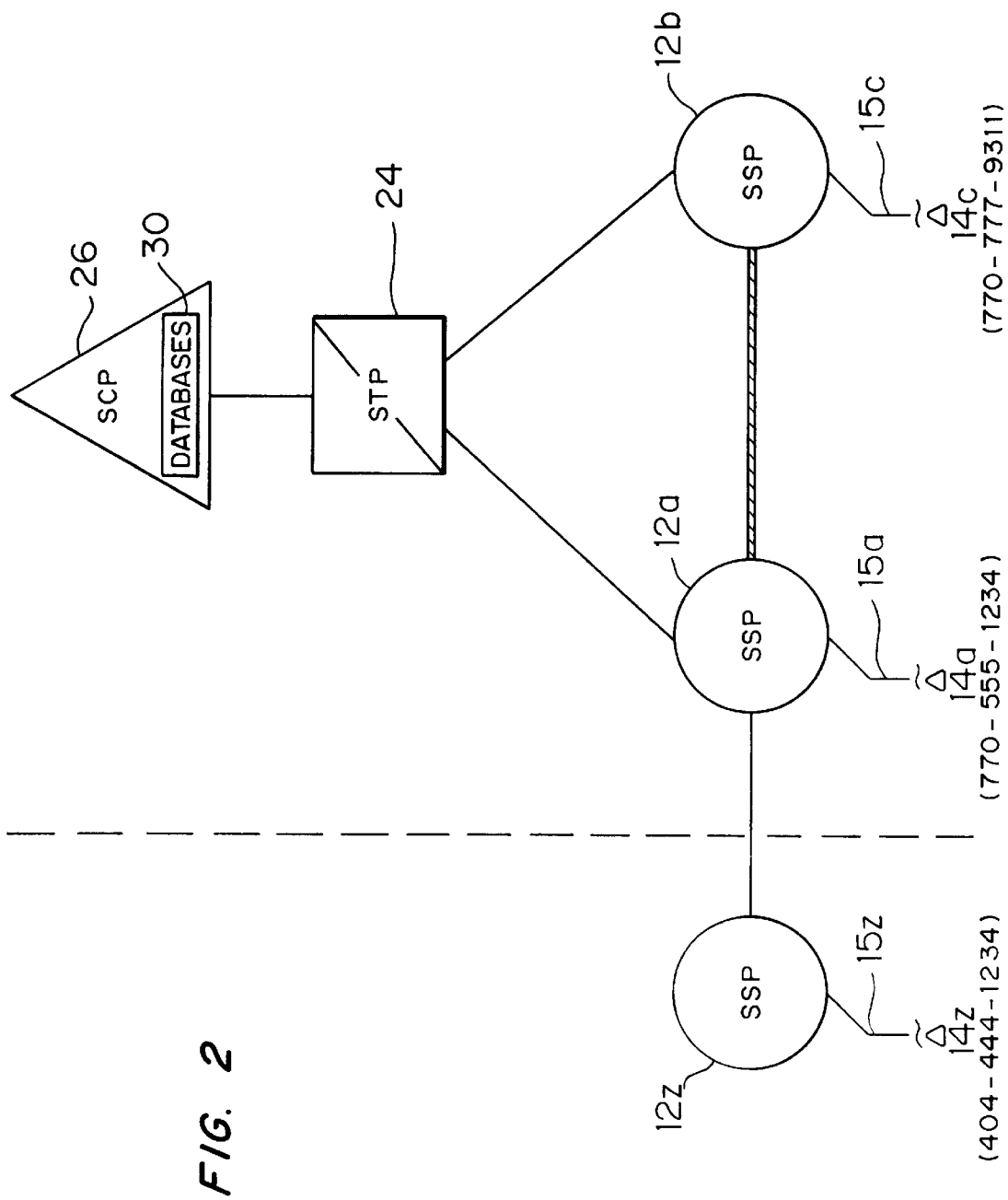
FIG. 2 is a diagram of an exemplary embodiment operating in the exemplary environment in accordance with the present invention.

Turning to FIG. 2, the exemplary operation of the present invention is described in the context of a calling party placing a call to a called party who subscribes to the FCF service. The present invention activates the FCF service so that calls are forwarded from the called party number to a location designated by the subscriber/called party when there is no answer at the subscriber's terminating equipment. Activation of the FCF service occurs without a turn-on call from the subscriber.

In an exemplary embodiment, the present invention is implemented through an autoroute service feature. Generally, the autoroute service feature is activated upon receipt of a first call to the called party number that is not answered. The autoroute service feature processes the first call by determining where the first call is to be routed. In addition, the autoroute service feature activates the enhanced telecommunication service to which the called party subscribes. Once the enhanced telecommunication service is activated, successive calls directed to the called party number are diverted for processing without first routing the call to the line of the called party number. Moreover, the enhanced telecommunication service is applied to the successive calls to the called party number. The autoroute service feature can be deactivated, for example, by entering a feature code, as is further explained below.

Advantageously, it is no longer necessary for the subscriber to activate an enhanced telecommunication service with a turn-on call as typically has been the case for some enhanced telecommunication services, such as the FCF service. It will be appreciated by one skilled in the art that the present invention is not limited to activating the FCF service, but may also include activating any enhanced telecommunication service generally suited for this environment.

Illustration of the present invention is described by way of an example. In this example, the subscriber ("Dale") is a workaholic and spends most of his time at his office. The remainder of his time is spent at home. Consequently, when Dale is not at home, Dale desires all calls to his home to be forwarded to his office. Specifically, Dale desires all calls directed to Dale's home telephone number (770-777-9311) associated with his called party telephone 14c to be forwarded to his office telephone number (404-444-1234) associated with his office telephone 14z. Dale's called party telephone 14c is connected by line 15c to SSP 12b, and Dale's office telephone 14z is connected by line 15z to SSP 12z. For purposes of this discussion, Dale's home telephone number and office telephone number may generically be referred to as a called party number and a forwarding directory number, respectively.

When Dale initially sets up the autoroute service feature, a terminating attempt (TAT) trigger or service trigger is prescribed to Dale's line. The TAT trigger is in an inactive state until the trigger is activated. The inactive state is indicative of the TAT trigger being inactive or turned off. Consequently, in the inactive state, the enhanced telecommunication service is not applied to calls received for the called party telephone 14c. As a part of the set up process, Dale provides his office telephone number (404-444-1234) as the forwarding directory number. Providing the forwarding directory number may entail dialing a customer service number for the autoroute service feature and entering the forwarding directory number when prompted to do so. It will be appreciated by one skilled in the art that the forwarding directory number may be any directory number the subscriber desires including, but not limited to, a pager number, an answering service number, a cellular telephone number, and so forth.

After the autoroute service feature has been set up, a calling party ("Veda") having a calling party number (770-555-1234) uses her telephone 14a, which is connected by calling line 15a to SSP 12a. Veda places a call to Dale's called party telephone 14c having the called party number (770-777-9311). The SSP 12a serving the calling party number receives the communication and sets up the communication to an SSP 12b serving the called party number. The call is set up in a conventional manner, wherein the SSP 12a obtains information relating to the communication, as well as routing information. The SSP 12a then sends the information relating to the communication in a signaling message to the SSP 12b. The SSP 12b sends the communication to the called party telephone 14c.

If there is a no answer condition detected at the called party number, the call is sent to the SSP 12b. The no answer condition is a condition in which the called party number is not answered after a predetermined time period, for example, the time it takes for three rings to occur. The SSP 12b routes the communication to a special number associated with the autoroute service feature. The special number also may be served by a network element, SSP 12b, or another network element, such as SCN 42 (FIG. 1). This special number, for example, 111-1111, has a public office dialing plan (PODP) trigger assigned to it.

The communication from Veda to Dale encounters the PODP trigger defined at SSP 12b. Due to the trigger, the switch pauses in the processing of the call and obtains further instructions from other network elements. The SSP 12b pauses in the processing of the communication to request instructions from SCP 26 via STP 24. The SSP 12b provides the SCP 26 with information relating to the communication as a part of the SSP's query to the SCP 26, including redirecting party information. Redirecting party information contains the called party number of the subscriber.

In response to the query provided by SSP 12b, SCP 26 identifies the subscriber by performing a search in database 30. Database 30 preferably is an autoroute database containing subscriber information and forwarding information. Based on 1) the redirecting party information obtained from the query and 2) the trigger type, in this case a PODP trigger, database 30 determines whether the called party is a subscriber of the autoroute service feature. If the redirecting party information matches subscriber information located in database 30, database 30 provides a forwarding directory number associated with the subscriber. The SCP 26 provides instructions that the communication is to be routed to the forwarding directory number in a response to the SSP 12b. In addition, the SCP 26 provides instructions to SSP 12b to activate or turn on the prescribed TAT trigger associated with the called party number.

Once the prescribed TAT trigger (service trigger) is activated, the enhanced telecommunication service is applied to calls received for the called party number. In this example, it is determined that Dale is a subscriber to the autoroute service feature and the forwarding directory number is his office telephone number (404-444-1234). Therefore, the SCP 26 provides instructions to SSP 12b to route the communication to the SSP 12z serving the office telephone number. The SCP 26 also provides instructions to activate the prescribed TAT trigger on line 15c for the autoroute service feature. The SSP 12b then routes the communication to the SSP 12z and activates the prescribed TAT trigger, thereby placing the prescribed TAT trigger in an active state. When the TAT trigger is in the active state, the enhanced telecommunication service is applied to calls received for the called party number. Consequently, the call from Veda is routed to the office telephone number associated with Dale's office telephone 14z.

When a second call is directed to Dale's home telephone number, the communication is routed to the office telephone number associated with Dale's office telephone 14z. Specifically, the second call is first routed to the SSP 12b serving the called party number. The second call encounters the prescribed TAT trigger, which is now in the active state. Due to the TAT trigger, the call processing is halted at the SSP 12b. The SSP 12b requests instructions from the SCP 26 via STP 24. The SSP 12b provides the SCP 26 with information relating to the communication as a part of the SSP's query to the SCP 26. In response to the query provided by the SSP 12b, the SCP 26 obtains the forwarding directory number associated with the subscriber information contained within database 30. The SCP 26 provides instructions to the SSP 12b to route the communication to the forwarding directory number. The SSP 12b routes the communication to the forwarding directory number.

In essence, after the first call, all successive calls are intercepted at the SSP 12b before reaching the called party telephone 14c. The successive calls are no longer sent to the called party telephone 14c—that is, the called party telephone 14c does not ring after the first call. Instead, the successive calls are intercepted at the SSP 12b and diverted to the autoroute service feature. The autoroute service feature routes the call to the destination designated by the called party. Therefore, successive calls encounter the service trigger and receive the enhanced telecommunications service rather than encountering the no answer condition.

When Dale returns home, Dale can deactivate the autoroute service feature by simply entering a feature code, for example, *99. The feature code has been provisioned with a feature access code (FAC) trigger by a telecommunication service provider. Consequently, when Dale enters the feature code, the SSP 12b sends a TCAP message containing the feature code to the SCP 26.

The feature code is recognized by SSP 12b as an indicator of the special status of the communication. In other words, the feature code typically triggers the switch to pause in the processing of the call and to obtain further instructions from other network elements, such as SCP 26. In the example, Dale's call to the feature code is received in SSP 12b, which pauses in the processing of the communication to request instructions from the SCP 26. As part of the SSP's query to the SCP 26 for processing instructions, the SSP 12b provides the SCP 26 with information relating to the communication. In particular, the SSP 12b provides the SCP 26 with communication information including the feature code and the calling line number. In addition, the SSP 12b provides the SCP 26 with identification information with respect to itself. This identification information may include an originating point code (OPC) or other identifier as appropriate.

In response to receiving the communication information and the identification information from the SSP 12b, the SCP 26 carries out certain functions. The SCP 26 recognizes the feature code as indicative that the communication contains autoroute information that the SCP 26 must process. The SCP 26 is responsible for translating the autoroute information by checking its database 30. Database 30 indicates that the TAT trigger on line 15c must be deactivated or turned off. Consequently, the SCP 26 provides instructions to the SSP 12b to deactivate the TAT trigger on line 15c. SSP 12b deactivates the TAT trigger on line 15c. Hence, calls directed to the called party number are no longer forwarded to Dale's office telephone number.

Advantageously, the exemplary embodiment of the present invention provides activation of an enhanced telecommunication service without a turn-on call by the subscriber. Specifically, the present invention activates the enhanced telecommunication service upon receipt of a first call to the called party number that encounters a no answer condition from the called party number. Thereafter, all successive calls directed to the called party number are diverted for processing without first routing the call to the line of the called party number. The successive calls encounter a service trigger and receive the enhanced telecommunication service without encountering the no answer condition.

Activating an Enhanced Telecommunication Service

Figure 3:
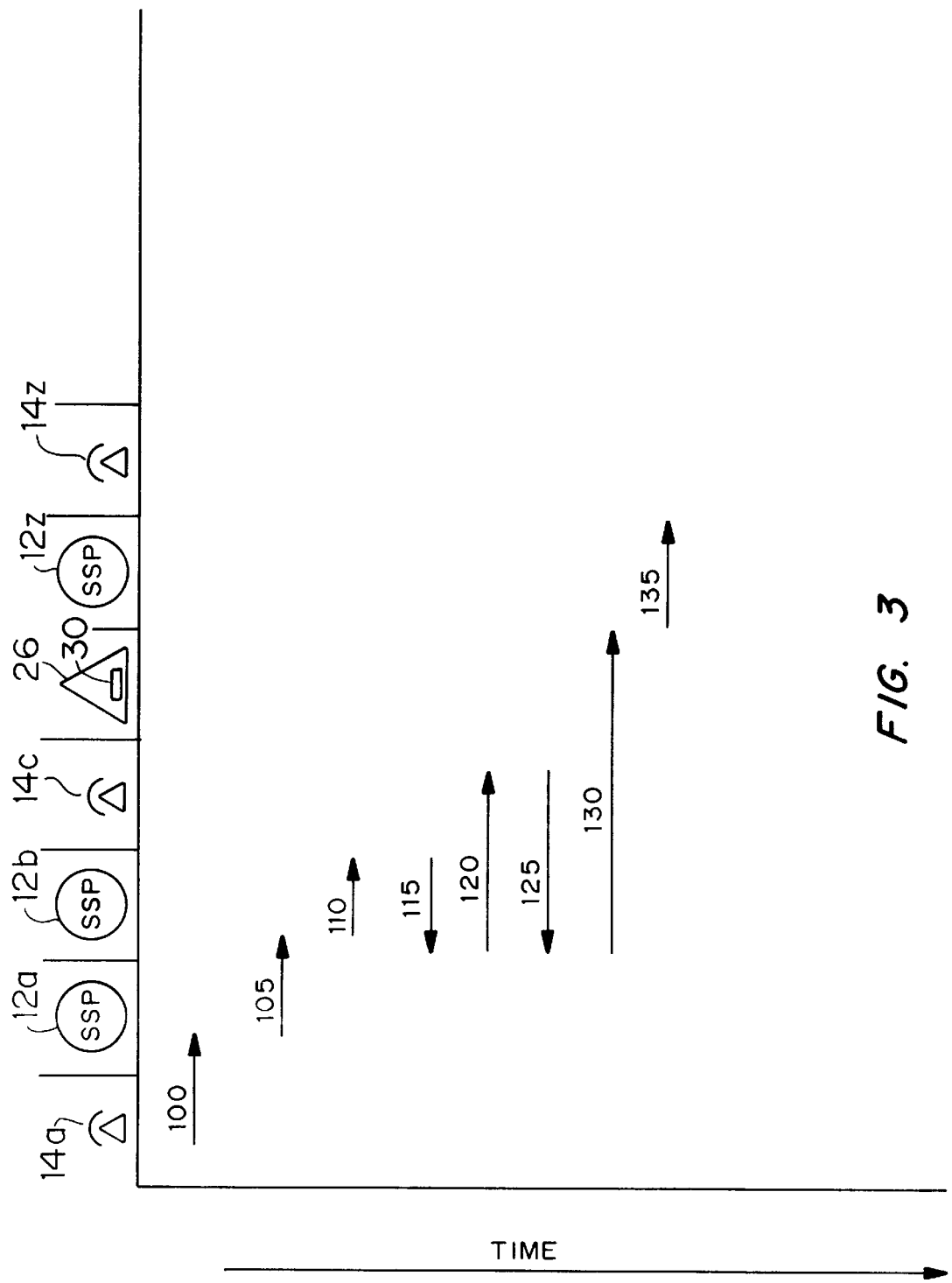
FIG. 3 is a timing diagram illustrating an exemplary method of the present invention.

Now turning to FIG. 3, the process by which an enhanced telecommunication service is activated upon detection of a no answer condition is described using a timing diagram.

In step 100, a calling party places a call using the telephone 14a to a called party telephone 14c. The SSP 12a serving the calling party number receives the communication and sets up the communication to an SSP 12b serving the called party number. The call is set up in a conventional manner, wherein the SSP 12a obtains information relating to the communication, as well as routing information. Next, in step 105, the SSP 12a then sends the information relating to the communication in a signaling message to the SSP 12b.

In step 110, the SSP 12b routes the communication to the called party telephone 14c. If a no answer condition is detected at the called party number, the communication is sent to the SSP 12b (step 115). The SSP 12b routes the communication to a special number associated with the autoroute service feature, which also may be served by the SSP 12b. The special number has a public office dialing plan (PODP) trigger assigned to it.

The communication encounters the PODP trigger defined at SSP 12b. Due to the trigger, the switch pauses in the processing of the call and obtains further instructions from the SCP 26 via STP 24 (step 120). The SSP 12b provides the SCP 26 with information relating to the communication as a part of the SSP's query to the SCP 26.

In response to the query provided by SSP 12b, SCP 26 identifies the subscriber by performing a search in database 30, which is previously described with respect to FIG. 2. The SSP 12b obtains a forwarding directory number from database 30. After obtaining the forwarding directory number from database 30, the SCP 26 provides instructions to SSP 12b to route the communication to the SSP 12z serving the office telephone number. The SCP 26 also instructs the SSP 12b to activate a prescribed TAT trigger on line 15c for the autoroute service feature (step 125). As a result of activating the TAT trigger, all successive calls are diverted to the SCP 26 for processing without routing the calls to the line 15c of the called party number.

In step 130, the SSP 12b then routes the communication to the SSP 12z and activates the TAT trigger on line 15c connected to the SSP 12b. The communication is then routed to the office telephone 14z (step 135).

For successive calls to the called party number, the communication is routed to the office telephone number associated with office telephone 14z. The communication is no longer sent to the called party telephone 14c—that is, the called party telephone 14c does not ring after the first call. Instead, the call is intercepted at the SSP 12b and diverted to the autoroute service feature. The autoroute service feature routes the call to the destination designated by the called party.

Conclusion

The present invention activates an enhanced telecommunication service without direct action, such as a turn-on call, by the subscriber. The present invention activates the enhanced telecommunication service upon receipt of a first call to the called party number that encounters a no answer condition at the called party number. Thereafter, all successive calls directed to the called party number are diverted for processing without first routing the call to the line of the called party number. Hence, the successive calls receive the enhanced telecommunication service without encountering the no answer condition.

Alternative embodiments will become apparent to those skilled in the art to which the present invention pertains without departing from its spirit and scope. Accordingly, the scope of the present invention is defined by the appended claims rather than the foregoing description.

What is claimed is:

1. In an Advanced Intelligent Network, where an enhanced telecommunication service is set up for a directory number, the enhanced telecommunication service having an active state wherein the enhanced telecommunication service is applied to calls received for the directory number and an inactive state wherein the enhanced telecommunication service is not applied to calls received for the directory number, a method for activation of the enhanced telecommunication service without a turn-on call from a subscriber, the method comprising:

receiving a first call directed to the directory number, where the enhanced telecommunication service is in the inactive state;

with respect to the first call, making a detection of a no answer condition from the directory number; and in response to the detection of the no answer condition, changing the enhanced telecommunication service to the active state;

whereby the enhanced telecommunication service is activated by the detection of the no answer condition for the first call, without the turn-on call from the subscriber.

2. The method of claim 1, further comprising maintaining the enhanced telecommunication service in the active state for successive calls by applying the enhanced telecommunication service to the successive calls to the directory number.

3. The method of claim 2, further comprising diverting the successive calls for processing without routing the successive calls to a line of the directory number.

4. The method of claim 1, after making the detection of the no answer condition with respect to the first call, further comprising routing the first call to a forwarding directory number designated by the subscriber.

5. In a telecommunications system, with respect to a first call that encounters a no answer condition, a method for activating an enhanced telecommunication service so that successive calls avoid the no answer condition, comprising:

receiving a first call directed to a directory number;

in connection with the first call, making a detection of the no answer condition from the directory number;

upon the detection of the no answer condition, obtaining information related to the directory number; and based on the information related to the directory number, provisioning the directory number with a service trigger for activation of enhanced telecommunication service in response to a successive call directed to the directory number, whereby the successive calls encounter the service trigger and receive the enhanced telecommunication service rather than encountering the no answer condition.

6. The method of claim 5, wherein obtaining information related to the directory number comprises obtaining a forwarding directory number; and further comprising routing the first call to the forwarding directory number.

7. With respect to a first communication that encounters a no answer condition, a system for activating an enhanced telecommunication service so that a further communication avoids the no answer condition, comprising:

a first network element being operative to receive a first communication directed to a directory number;

in connection with the first communication, the first network element being operative to make a detection of a no answer condition from the directory number;

a second network element being operative to obtain instructions to activate a prescribed terminating attempt (TAT) trigger in connection with the directory number and to transmit the instructions to the first network element; and the first network element being operative to activate the prescribed TAT trigger in connection with the directory number whereby activating the prescribed TAT trigger in connection with the directory number activates the enhanced telecommunication service so that a further communication directed to the directory number receives the enhanced telecommunication service rather than encountering the no answer condition.

8. The system of claim 7, further comprising:

the first network element being operative to receive a second communication directed to the directory number;

the second communication encountering the prescribed TAT trigger;

the second network element being operative to receive the second communication, the second communication receiving the enhanced telecommunication service;

the second network element being operative to obtain a forwarding directory number and being operative to route the second communication and the forwarding directory number to the first network element; and the first network element being operative to route the second communication to the forwarding directory number.

* * * * *